United States Patent [19]
Linkohr et al.

[11] 3,957,534
[45] May 18, 1976

[54] DIAPHRAGM FOR THE SEPARATION OF HYDROGEN FROM HYDROGEN-CONTAINING GASEOUS MIXTURES

[75] Inventors: Rolf Linkohr, Stuttgart; Heinz G. Plust, Neuhausen, both of Germany

[73] Assignee: Firma Deutsche Automobilgesellschaft mbH, Germany

[22] Filed: Feb. 19, 1974

[21] Appl. No.: 443,192

[30] Foreign Application Priority Data
Feb. 17, 1973   Germany............................ 2307853

[52] U.S. Cl................................ 136/86 D; 55/158; 75/170; 75/175.5; 136/86 DD; 136/120 R
[51] Int. Cl.²............................................ H01M 4/86
[58] Field of Search................... 75/170, 175.5, 211; 136/86 DD, 142, 146, 148, 86 D, 120 R; 55/158

[56] References Cited
UNITED STATES PATENTS

| | | | |
|---|---|---|---|
| 2,958,391 | 11/1960 | De Rosset | 55/158 |
| 3,093,514 | 6/1963 | McCallum et al. | 75/175.5 |
| 3,118,828 | 1/1964 | Cotton et al. | 75/175.5 |
| 3,190,749 | 6/1965 | Fleming | 75/170 |
| 3,337,368 | 8/1967 | Oswin | 136/86 DD |
| 3,534,531 | 10/1970 | Eguchi et al. | 55/158 |
| 3,669,745 | 6/1972 | Beccu | 136/120 R |
| 3,824,131 | 7/1974 | Beccu | 136/86 D |

OTHER PUBLICATIONS

Buehler, W. et al.; *Effect of Law–Temp. Phase Changes on . . . Alloys near Comp. TiNi;* in *J. Appl. Phys.*, 34, pp. 1475–1477, May 1963.
Justi; E. et al., *Electrocat. in Ni—Ti System;* in *Energy Conversion*, 10, Apr. 1970, pp. 183–187 and 3 "Plates."

*Primary Examiner*—Walter R. Satterfield
*Attorney, Agent, or Firm*—Craig & Antonelli

[57] ABSTRACT

A hydrogen diffusion diaphragm for selective separation of hydrogen from hydrogen-containing gaseous mixtures, which comprises a body of a titanium-alloy of more than 50 molar percent of nickel exhibiting a diffusion coefficient sufficient to allow permeation of the hydrogen through the diaphragm. The diaphragm is produced by mixing nickel and titanium in such proportions that the resultant mixture contains more than 50 molar percent of nickel, by forming the mixture into an alloy and by shaping the alloy into a diaphragm.

8 Claims, No Drawings

DIAPHRAGM FOR THE SEPARATION OF HYDROGEN FROM HYDROGEN-CONTAINING GASEOUS MIXTURES

The present invention relates to a diaphragm for the separation of hydrogen from hydrogen-containing gaseous mixtures, as well as to the use of the diaphragm in hydrogen separation processes or in the purification of gaseous hydrogen, and also the use of the diaphragm as a two-phase hydrogen electrode in galvanic cells containing, as one of the electrodes, a nonporous hydrogen diaphragm electrode.

It is known that most of the transition metals chemisorb hydrogen on their surfaces, and a large number of these transition metals can also absorb hydrogen in their lattice. In other words, these transition metals possess a considerable absorbability or affinity for hydrogen which additionally can be in equilibrium with the formation of hydride phases therein. If such a metal is brought into contact with hydrogen, an equilibrium will occur between the partial hydrogen pressure $pH_2$ and the concentration $c$ of the hydrogen in the metal lattice. If a metallic disk is employed which is in equilibrium on one side with a partial hydrogen pressure $pH_2(1)$ and on the other side with a partial hydrogen pressure $pH_2(2)$ [$pH_2(1) > pH_2(2)$], the hydrogen concentrations $c_1$ and $c_2$ ($c_1 > c_2$) are produced in the proximity of the surfaces of this disk. This difference in concentration effects a diffusion in the interior of the metal disk, and as a consequence thereof, the hydrogen passes from one gaseous space through the metal disk into another gaseous space (i.e. by permeation). The gas flow $j$, in the stationary case, has the magnitude $$J = -D \, \frac{c_2 - c_1}{d},$$

wherein $D$ = the diffusion coefficient (cm²/sec.) and $d$ = the thickness of the disk (cm.). Since there are generally limits to the thickness of the disk or diaphragm for mechanical reasons (about 0.01 cm.), the permeation is essentially determined by the diffusion coefficient. However, it must also be kept in mind in this connection that the absorption of hydrogen in the metal is accompanied by a more or less pronounced lattice expansion, resulting — especially in case a concentration gradient is present ($c_2 - c_1$) — in the mechanical destruction of the diaphragm. Therefore, a large diffusion coefficient and a small absorbability are of maximum significance for obtaining the permeation effect.

In order to practically utilize permeation for the separation of hydrogen from hydrogen-containing gaseous mixtures, palladium, proved to be suitable and especially palladium/silver alloys (e.g., 77% Pd, 23% AG — *Platin Metals Rev.* 6 (4) 130 [1962]), and also palladium/boron and palladium/gold alloys (described in DOS [German Unexamined Laid-Open Application] 1,467,078 and DOS 1,496,175). Thus, appliances are nowadays commercially available using diffusion tubes of Pd/Ag alloys heated to 400°–500°C., by means of which maximum-purity hydrogen can be produced on a laboratory as well as technical scale. As the hydrogen-containing gaseous mixtures, those are utilized which are obtained, for example, during the steam reforming process, the cracking of hydrocarbons, methanol, inter alia, or during the ammonia cracking procedure. The thus-obtained pure hydrogen can then be used, for example, for chemical reactions (e.g., syntheses, or hydrogenations), in metallurgical processes (e.g. protective gas), or for the supply of fuel cells operating with hydrogen as the reaction gas.

However, Pd/Ag alloys also become brittle very easily, for the reasons mentioned in the foregoing, when heated and cooled in a hydrogen atmosphere. This disadvantage must be eliminated by first evacuating the diffusion section of a separating device and introducing the gaseous mixture only after the operating temperature has been attained. When the device is shut down, the same procedure is followed. An additional disadvantage to be considered is the relatively high price of the Pd/Ag alloy, costing about 5 German marks per gram, which results in a high initial capital outlay for the plant. The advantage of such devices is that the technical expenditure is relatively low and the energy requirement for operation is rather low as well. Accordingly, inview of the operating costs, such a plant is very economical.

In addition to being used for the production of pure hydrogen diaphragms, Pd/Ag alloys can also be utilized in galvanic elements as so-called two-phase electrodes (Vielstich, W. "Fuel Elements" publishers *Verlag Chemie GmbH* Weinheim/Bergstrasse, 1965, pp. 34, 66–73). The diaphragm in such electrodes is on one side in thermodynamic equilibrium with hydrogen or a hydrogen-containing gaseous mixture. The rapid creation of the equilibrium also at room temperature is effected in this arrangement by the application of hydrogen transfer catalysts on the surface of the diaphragm on the gas side. On the other side, the diaphragm is in contact with a suitable electrolyte e.g. 6M KOH, and can be effective as a negative hydrogen electrode in case of the presence of a positive counter electrode. Electrodes of this type with a thickness of 0.01 cm. have, at 20°C. and a $pH_2 = 1$ atmosphere gauge, a limiting current density of about 120 mA/cm².

This limiting current density is due to the diffusion resistance of the diaphragm which, with a given thickness, $d$ = 0.01 cm., results from the diffusion coefficient of about $0.34 \cdot 10^{-6}$ cm²/s. [$s$ = second] at 30°C. Higher current densities can only be attained with the use of thin diaphragms or by temperature elevation. The use of temperature elevation results in a rise in the diffusion coefficient to D (at 100°C.) = $2 \cdot 10^{-6}$cm²/s.; D (at 280°C.) = $5–8 \cdot 10^{-6}$cm²/s. (Bersier, J. and Küssner, A., "Diffusion Coefficient of Hydrogen in Palladium-Silver Alloy Electrodes", *Proc. Second Int. Symp. on Fuel Cells*, Brussels, June 19–23, 1967, pp. 303–311.)

Basically, such electrodes are of great interest in connection with hydrogen/air fuel cells, since these electrodes permit the use of hydrogen-containing gaseous mixtures, as they are obtained, for example, by the reforming of hydrocarbons. In this case, the advantages inherent in hydrocarbons, namely their inexpensiveness and good storability, can be exploited for fuel cells.

The fact that such a practical use of the Pd/Ag diaphragm electrodes in galvanic elements has not been realized heretofore is due to the fact that the long-term strength or stability of the electrodes is unsatisfactory (either because of the thus-formed concentration gradient resulting in a density gradient, or because of irreversible plastic deformations) for mechanical reasons. On the other hand, the current densities attainable are, likewise, of an insufficient level due to the partial hydrogen pressure ($pH_2 < 1$ atmosphere) in the gaseous mixtures. The most important disadvantage speaking against the use of these electrodes, however, is the price for the Pd/Ag alloy. Even with the use of a diaphragm having a thickness of about 30 $\mu$, the costs for the material alone must be expected to be 560 German marks per kilowatt (*Proc. 5th Int. Symp. on Power Sources*, Brighton, 1966, pp. 531–542).

In summation, therefore, the following disadvantages are encountered for the various uses of the Pd/Ag diaphragm: a high price, mechanical instability and thus limited lifetime, as well as an insufficient diffusion coefficient at a low temperature (i.e., below, for example, 100° – 200°C.).

It is an object of this invention to provide a diaphragm suitable for the hydrogen permeation which does not exhibit the disadvantages enumerated above. This object is attained by a diaphragm of a nickel-titanium alloy having more than 50 molar percent of nickel, wherein the composition $Ni_3Ti$ proved to be especially suitable.

Such diaphragms are eminently suitable for the selective separation of hydrogen from hydrogen-containing gaseous mixtures and thus, also, for example, for the purification of hydrogen. Also, they are particularly useful as two-phase hydrogen electrodes in galvanic cells.

The alloy $Ni_3Ti$ has a surprisingly high diffusion coefficient at room temperature, as well as a usable solubility or absorbability for hydrogen and a good mechanical strength during operation.

Investigations have shown that alloys of titanium and nickel absorb hydrogen to a great extent. This holds true, in particular, for the intermetallic compound $Ti_2Ni$ up into the nickel content around that found in the compound TiNi. Ti/Ni alloys of such compositions have, therefore, also been investigated and proposed for use as hydrogen storage electrodes, DOS(German Unexamined Laid-Open Application) 1,771,239; *Energy Conv.* 10, 183–187 (1970); H. M. Ewe, "Electrochemical Storage and Oxidation of Hydrogen with Titanium-Nickel Alloys", doctor's thesis 1970, Technical College Braunschweig). The last-mentioned literature reference discloses that the compound $TiNi_3$ does not appear to have any storage capacity for hydrogen. This reference also confirms the finding that the compound $TiNi_3$ does not corrode in an alkaline medium, in contrast to the other compounds. Due to the great density changes occurring in the phases including the compositions of $Ti_2Ni$ and NiTi during hydrogen absorption and emission, they cannot be utilized for hydrogen permeation on a technically useful scale.

The investigation of the diffusion of hydrogen on $Ti_2Ni$ and TiNi showed a dependence of the diffusion coefficients on the hydrogen concentration. For $Ti_2Ni$, the diffusion coefficient was, in the range of higher hydrogen concentrations, $1 \cdot 10^{-10}$ to $2 \cdot 10^{-10}$ cm$^2$/s. For the compositions richer in nickel, the diffusion coefficient decreased and was, for example, in case of TiNi about $1 \cdot 10^{-11}$ to $2 \cdot 10^{-11}$ cm$^2$/s., as demonstrated by H. M. Ewe in the above-mentioned doctor's thesis. Therefore, it was extraordinarily surprising that, for the compound $TiNi_3$, a diffusion coefficient was found of $D = 1 \cdot 10^{-5}$ cm$^2$/s. at room temperature.

The size of these diffusion coefficients exceeds that of hydrogen in palladium/silver alloys by the factor of 10. Thus, the phase around the composition of $TiNi_3$ proves to be much more advantageous technically for use in the separation of hydrogen from gaseous mixtures and/or for use as nonporous hydrogen diaphragm electrode than the Pd/Ag alloy heretofore known for this purpose. Therefore, according to the present invention, it is suggested to employ diaphragms of Ti/Ni alloys—especially those having compositions around $TiNi_3$, i.e. for a molar ratio of Ti to Ni of from $Ti_{0.8}:Ni_{3.2}$ to $Ti_{1.1}:Ni_{2.9}$ for the fields of application mentioned hereinabove.

Another advantage of the alloys around $TiNi_3$ can be seen in that there is a solubility or absorbability for hydrogen, contrary to the generally accepted technical teaching. This solubility or absorbability, however, does not exceed the value of $2.5 \cdot 10^{-2}$ atoms of hydrogen per liter of $TiNi_3$ at room temperature and thus does not result in density changes in the material leading to a mechanical destruction thereof. Generally, this value is from 0.5 to $2.5 \cdot 10^{-2}$ atoms of hydrogen per liter of $TiNi_3$. Therefore, also in connection with the long-term stability feature, diaphragms of the material of the present invention are superior to the heretofore conventional diaphragms made of palladium/silver alloys.

Finally, a quite special economic advantage can be seen in that nickel/titanium alloys are much more favorable as compared to palladium/silver alloys already regarding the price of the material. A comparison yields about 11 German marks per kg. for the alloy having the composition of $TiNi_3$ and about 5,000 German marks per kg. for the palladium/silver alloys.

Although the adjustment to the equilibrium of partial hydrogen pressure in the gas volume: absorbed hydrogen is less inhibited than is the case in palladium and its silver alloys, it is advantageous to provide a rapid production of the equilibrium at room temperature by a conventional application of hydrogen transfer catalysts. This measure is of special importance for the use of the diaphragm in galvanic elements. Examples for suitable hydrogen transfer catalysts are uranium hydrides e.g. $UH_2$ or titanium hydrides, e.g., $TiH_2$, metallic black from platinum, palladium, or rhodium, as well as from mixtures of palladium/rhodium, platinum/rhodium, or platinum/indium, silicon, Raney metals, coatings of alloys of palladium or tantalum with Pt, Rh, In, Ag, Cu, Ni, Co, or Fe. e.g. 0.5 to 10% by weight. Especially advantageous now have also proven to be $Ti_2Ni$ and TiNi, as well as mixtures of both. Accordingly, the surface of the hydrogen diffusion diaphragm is preferably activated with a suitable catalyst, wherein the metal hydrides, the metal blacks, or the Ti/Ni alloys with at most 50 molar percent of nickel are preferred.

Moreover, in the use of the diaphragm as a hydrogen electrode in galvanic cells, it proved to be advantageous to deposit catalysts on the side of the diaphragm facing the electrolyte, which catalysts keep the polarization of the electrode at a low level. Effective in this respect are depositions of, for example, copper, Raney metals (A. Küssner, "Investigations on the Mechanism of the Catalyzed Interface Reaction of Hydrogen with Palladium, Tantalum, and Titanium", *Z.f. Elektrochem.* 66 (8/9), 675–679 [1962]), metal blacks (H. G. Oswin, N. I. Palmer, St. M. Chodosh, and F. P. Malaspina, "Hydrogen Diffusion Electrode for Fuel Elements", DAS 1,496,145 and DOS 1,496,172), amorphous nickel-, cobalt-, or iron-boron compounds.

Such diaphragms can be manufactured in a conventional manner by metallurgical processes, e.g. sintering of nickel powder with titanium powder and/or titanium hydride powder, or melting the alloy together from the metals. Advantageously, plates are first produced which are then rolled to diaphragms of the desired thickness in accordance with known methods. A suitable form for the sintered or melted crude product is a plate of about 1 to 2 mm. in thickness, which is merely rolled thin. The application of the hydrogen transfer catalysts or the catalysts counteracting the polarization of the electrode can be effected prior to or after the rolling step, depending on which amount of catalyst is desired on the diaphragm or electrode.

The following examples will explain the invention:

EXAMPLE 1

Pulverized nickel (particle size about $5\mu$) and pulverized titanium (particle size about $50\mu$) in a stoichiometric proportion of $TiNi_3$ are mixed and pressed, under 2 tons/cm², into plates. (Pressure of from 1–4 tons/cm² may be used). Thereafter, the plates are tempered in a hydrogen stream at about 950°C. (effective tempering can be conducted at 800°–1000°C.) for various periods of time between 2 and 8 hours and then again brought to room temperature. A tempering period of 3–4 hours yielded especially good results. The hydrogen-containing sintered plates are comminuted and ground into a so-called standard powder (particle size about $50\mu$).

This standard powder is then again pressed into plates having a thickness of 1 mm. (at 15 tons/cm², with a range of 10–15 tons/cm² also being suitable) in a second process step and tempered under vacuum (below $10^{-3}$ torr. [mm. Hg]) at 950°C. (800°–1000°C. being an acceptable range) for 10 hours (8–10 hours being an effective range). The plate, brought to room temperature and now free of hydrogen, can then be made into the desired thickness of 0.1 to 2 mm. by cold rolling. This diaphragm exhibits a diffusion coefficient of $0.9 \cdot 10^{-5}$ cm²/s.

The diaphragm can be utilized, in its present shape, for hydrogen separation by means of permeation.

EXAMPLE 2

The standard powder produced according to Example 1, made from a stoichiometric mixture of nickel powder (particle size of about $3\mu$) and titanium powder (particle size of about $50\mu$), and a stoichiometric mixture of nickel powder (particle size of about $3\mu$) and titanium sponge (particle size of about $50\mu$), wherein the proportion in each case corresponded to the composition of $TiNi_3$, were respectively brought, in different experiments, to at least 1400°–1500°C. in a graphite crucible under vacuum; the respective material melts into a compact, nonporous product. After cooling, the melt-produced element is cold-rolled into a diaphragm of the desired thickness of 0.1 to 2 mm. and a diffusion coefficient of $1 \cdot 10^{-5}$ cm²/s.

Particularly suitable in this connection proved to be a crucible having a melting chamber of rectangular size and a depth of about 1 to 2 mm.

The following examples show the application of the hydrogen transfer catalyst. Several basic modes of operation will be demonstrated for the preparation of preferred embodiments of the diaphragms.

EXAMPLE 3

A diaphragm prepared according to Example 1 is introduced, after careful cleansing by sandblasting and washing with methanol, into 4N KOH and charged cathodically with the use of platinum counter electrodes with 30 MA/cm². Gas evolution occurs. Thereafter, the diaphragm is withdrawn from the electrolyte and rinsed with distilled water.

When the diaphragm is then immersed into a 1–3% aqueous palladium chloride solution, a firmly adhering palladium black layer ($0.5 - 1\mu$ thick) is precipitated on the diaphragm. After washing with distilled water and drying at $T = 80°-100°C.$, the coated diaphragm is ready for use in $H_2$ permeation. Also, a diaphragm produced in accordance with Example 2 was processed in an identical manner to form a coated diaphragm.

In place of the palladium solution, it is also possible to use other metallic solutions for the black deposition.

EXAMPLE 4

A diaphragm produced according to Example 1 is spread on one side with Ti powder (a particle size of about $10\mu$) in a thin layer of about $10-20\mu$ thickness, and the powder is pressed or rolled into the diaphragm under a pressure of 5 tons/cm² (pressure of 3–6 tons/cm² may be used). Thereafter, by treating the thus-prepared diaphragm with hydrogen at $T = 400°C.$, for 30 minutes, the titanium is converted into the hydride. (Temperature of from 400 to 450°C. and a period of from 20 to 40 minutes also are effective.)

As a modification, the other electrolyte side of the diaphragm, when the diaphragm is to be used as a hydrogen foil electrode, can be activated as follows in order to reduce the polarization: The diaphragm is exposed on one side, after previous cleaning and degreasing, to a deposition bath consisting of an aqueous solution of 30 g./l. of $NiCl_2$ 6 $H_2O$, 100 g./l. of $NH_3$, and 3 g./l. of $NaBH_4$.

The deposition of the catalyst layer takes place at room temperature. After 40 to 60 minutes at room temperature, the catalyst has been precipitated in a smooth layer with a dark luster in the sufficient thickness. The diaphragm is withdrawn from the deposition bath and is ready for use after washing with distilled water. In a like manner, the diaphragm of Example 1 was processed to form a catalyst layer on the sides of the disphragm.

Of course, the diaphragms can also be produced in accordance with other, similar conventional processes. This also holds true for the application of the hydrogen transfer catalysts or the polarization-inhibiting catalysts. Furthermore, it will be appreciated that diaphragms may be formed into various shaped bodies depending upon the desired configuration, e.g. flat plates, curved plates, disks, cylinders and the like.

While the novel principles of the invention have been described, it will be understood that various omissions, modifications and changes in these principles may be made by one skilled in the art without departing from the spirit and scope of the invention.

What is claimed is:

1. A hydrogen diffusion diaphragm for the selective separation of hydrogen from hydrogen-containing gaseous mixtures, which consists of a shaped body that consists of a nickel-titanium alloy exhibiting a diffusion coefficient of from $10^{-6}$ to $10^{-5}$ cm²/s. at room temperature, said nickel-titanium alloy consisting of Ni and Ti with a molar ratio of Ti to Ni of from 0.8 : 3.2 to 1.1 : 2.9 and said shaped body being formed of a powder of said nickel-titanium alloy pressed under a pressure of from 10 to 15 tons/cm² and tempered at a temperature of from 800° to 1,000°C. for a period of from 8 to 10 hours under vacuum.

2. The hydrogen diffusion diaphragm according to claim 1, wherein the nickel-titanium alloy consists of $TiNi_3$.

3. The hydrogen diffusion diaphragm according to claim 1, wherein the shaped body of the nickel titanium alloy is shaped as a plate.

4. The hydrogen diffusion diaphragm according to claim 2, wherein the shaped body exhibits a diffusion coefficient of $1 \cdot 10^{-5}$ cm$^2$/s. at room temperature.

5. A hydrogen diffusion diaphragm for the selective separation of hydrogen from hydrogen-containing gaseous mixtures, which consists of a shaped body that consists of a nickel-titanium alloy exhibiting a diffusion constant of from $10^{-6}$ to $10^{-5}$ cm$^2$/s. at room temperature, said nickel-titanium alloy consisting of Ni and Ti with a molar ratio of Ti to Ni of from 0.8 : 3.2 to 1.1 : 2.9 and said shaped body being formed from a mixture of nickel powder and titanium powder in said molar proportions, said mixture being heated to a temperature of at least 1,400°C. to 1,500°C. to melt said powders into a compact non-porous body.

6. The hydrogen diffusion diaphragm according to claim 5, wherein the shaped body exhibits a diffusion coefficient of $1 \cdot 10^{-5}$ cm$^2$/s. at room temperature.

7. The hydrogen diffusion diaphragm according to claim 5, wherein the nickel-titanium alloy consists of $TiNi_3$.

8. The hydrogen diffusion diaphragm according to claim 5, wherein the shaped body of the nickel-titanium alloy is shaped as a plate.

* * * * *